Aug. 7, 1934.  R. C. BERRY  1,969,683
CHANGE SPEED DEVICE
Filed March 23, 1932   2 Sheets-Sheet 1
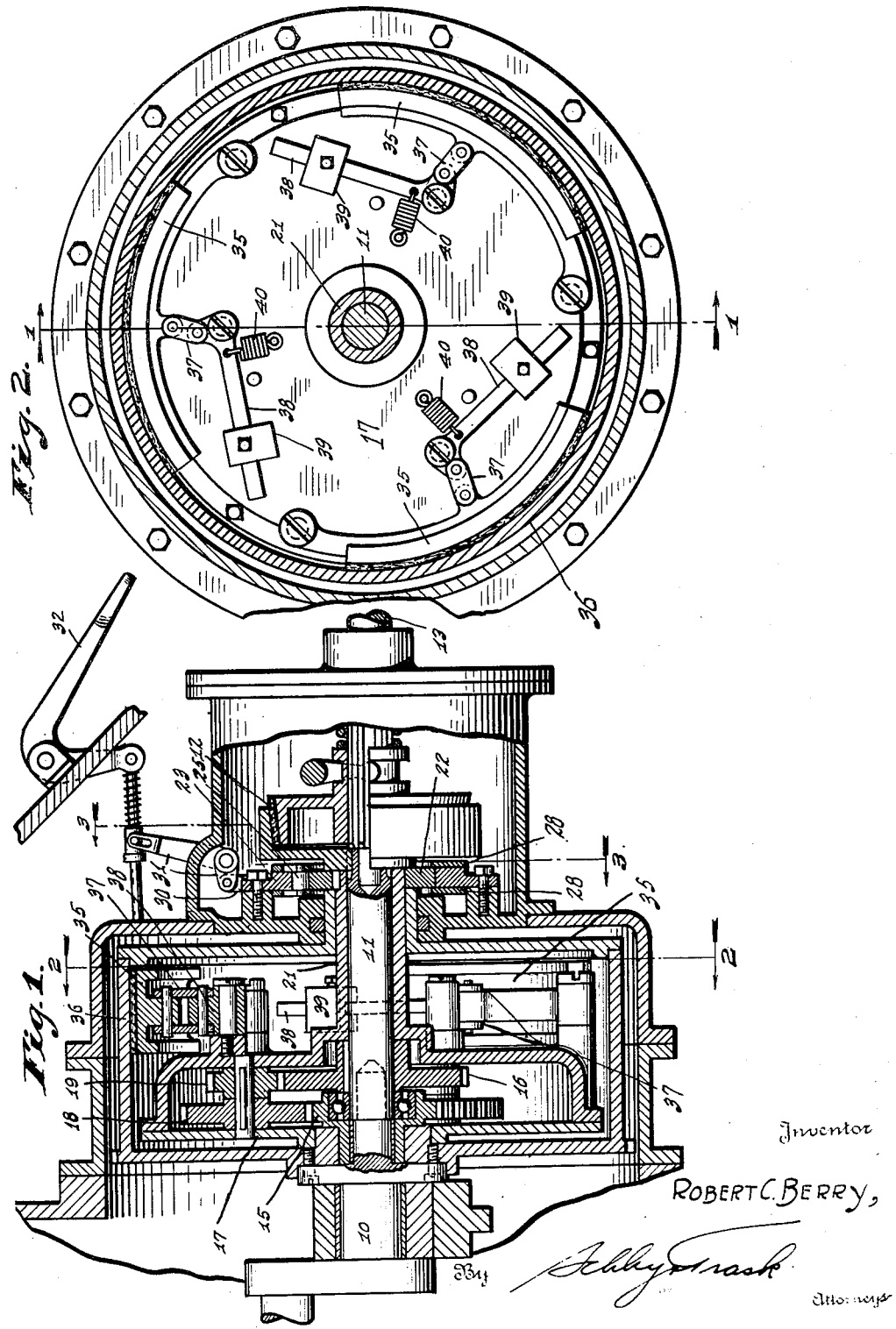
Inventor
ROBERT C. BERRY, Aug. 7, 1934.  R. C. BERRY  1,969,683
CHANGE SPEED DEVICE
Filed March 23, 1932   2 Sheets-Sheet 2
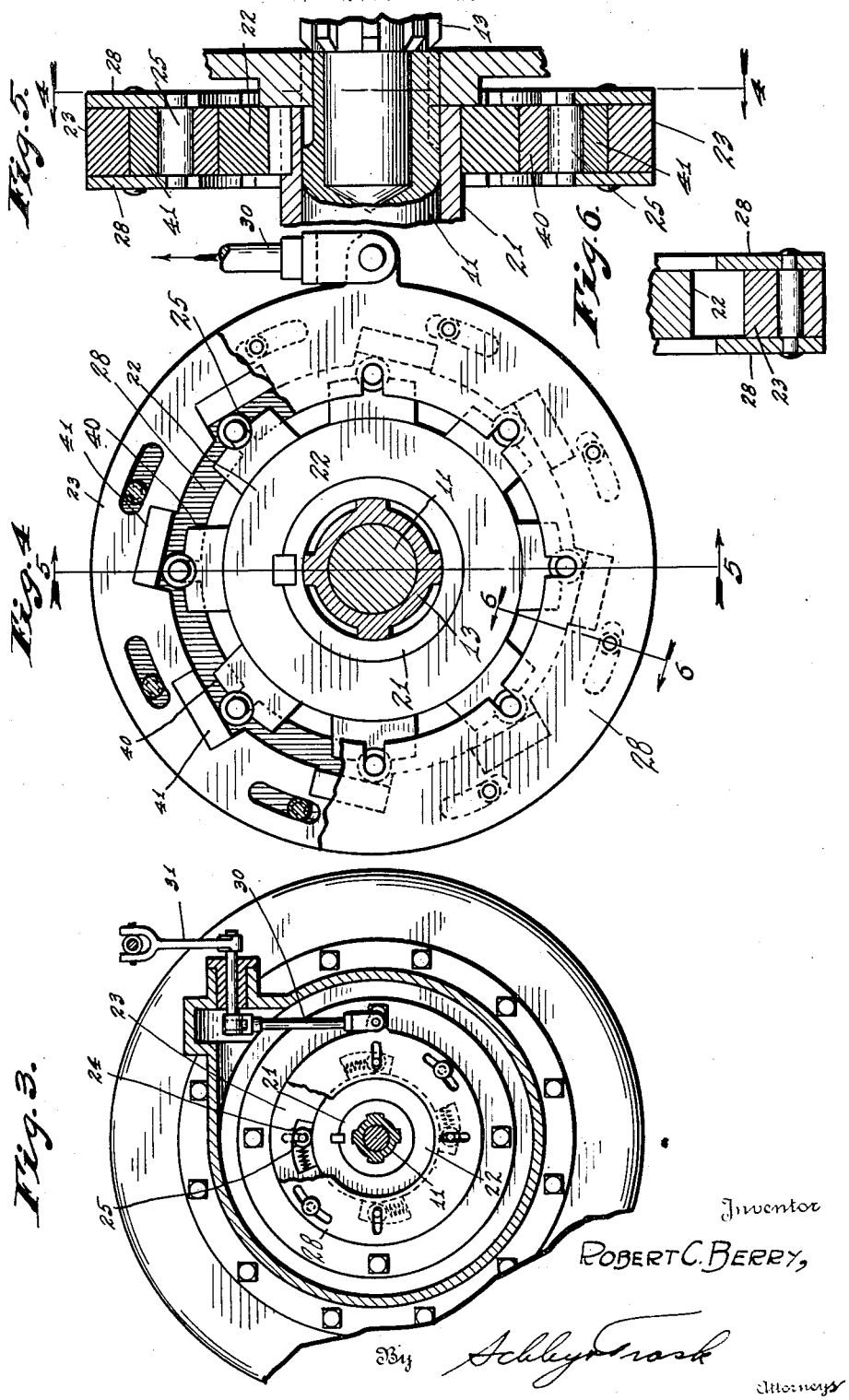
Inventor
Robert C. Berry,
By Schley Trask
Attorneys Patented Aug. 7, 1934

1,969,683

UNITED STATES PATENT OFFICE 1,969,683

CHANGE-SPEED DEVICE

Robert C. Berry, Indianapolis, Ind., assignor of one-half to Andrew J. Klaisler, Indianapolis, Ind.

Application March 23, 1932, Serial No. 600,724

6 Claims. (Cl. 74—34)

It is the object of my invention to produce a speed-changing device particularly suitable for use in automobiles. More specifically, it is my object to produce a speed-changing device which will afford an infinite number of speed-ratios between the driving and driven shafts—or, if the device is used in an automobile, between the automobile engine and the driving wheels. It is a further object of my invention to produce a device of this type which will be inoperative to drive the driven shaft when the engine or other power unit with which it is associated is idling.

In carrying out my invention, I arrange the driving and driven shafts co-axially and mount on them respectively gears of different sizes, the smaller gear being on the driving shaft if the device is to effect a speed-reduction. Rotatable co-axially with respect to the driving and driven shafts I provide a planet-gear carrier which carries one or more pairs of rigidly interconnecting gears that mesh respectively with gears on the driving and driven elements of the device. Acting between this planet-gear carrier and a stationary part there is mounted a unidirectional brake which can be released to permit free rotation of the planet-gear carrier in either direction. This overrunning brake is operated by the speed-controlling device of the engine in such a way as to be rendered inoperative whenever the engine is idle.

The accompanying drawings illustrate my invention: Fig. 1 is an axial section through the change-speed device on the line 1—1 of Fig. 2; Fig. 2 is a transverse section on the line 2—2 of Fig. 1; Fig. 3 is a transverse section on the line 3—3 of Fig. 1; Fig. 4 is a section on the line 4—4 of Fig. 5 illustrating a modified form of a unidirectional clutch which I prefer to employ; Fig. 5 is an axial section on the line 5—5 of Fig. 4; and Fig. 6 is a fragmental section on the line 6—6 of Fig. 4.

In the drawings, I have illustrated my improved speed-changing device as mounted at the rear end of an automobile engine the crankshaft 10 of which is shown in the drawings. The driven shaft 11 of the change-speed device is mounted co-axially with the crankshaft 10, and may be connected through a friction-clutch 12 with the propeller shaft 13 of the automobile.

To the rear end of the crankshaft 10 there is secured a gear 15, and on the driven shaft 11 there is mounted a gear 16 which, as the transmission is intended to effect a speed-reducing drive, is larger in diameter than the gear 15.

Mounted co-axially with and rotatable relatively to both the crankshaft 10 and the driven shaft 11 I provide a planet-gear carrier 17 which supports one or more pairs of planet-gears or back-gears, each pair comprising two rigidly interconnected gears 18 and 19 meshing respectively with the gears 15 and 16.

The gear carrier 17 has a hub 21 which extends along the driven shaft 11 and has mounted on its rear end a circular disk 22. In the plane of the disk 22, I mount a stationary ring 23 having at one or more points on its inner circumference recesses 24 adapted to receive rollers 25. The outer surface of each of the recesses 24 is inclined whereby the rollers may serve, in well known manner, to permit free rotation of the disk 22 and the planet-gear carrier in one direction but to prevent such rotation in the opposite direction.

In order to render the unidirectional brake comprising the disk 22 and ring 23 and rollers 25 inoperative when desired, I provide means for moving the rollers rearwardly in their associated recesses. For this purpose, the ends of the rollers may be reduced in diameter and may extend axially beyond the disk 22 and ring 23 to be received in generally radial slots in collars 28. The collars 28 are secured together and may be rocked to retract the rollers 25 from wedging engagement with the disk 22.

For the purpose of rocking the collars 28 to control the action of the rollers 25, a link 30 may connect an eccentric point on the collars 28 with one arm of a bell crank 31 the other arm of which is interconnected with the accelerator pedal 32 which controls engine speed. This control is so effected that when the accelerator pedal 32 is up and the engine therefore idling the rollers 25 are retracted from operative position.

On the rear face of the gear carrier 17 I mount a plurality of shoes 35 adapted for radial movement into and out of frictional engagement with a drum 36 which rotates with the crankshaft 10 of the engine. For the purpose of effecting outward movement of the shoes 35, each of them is connected by a link 37 to a swinging arm 38 which carries a weight 39. The parts are so arranged that as the gear-carrier rotates the weights 39, tending to move outward under the influence of centrifugal force, move the shoes 35 outward into frictional engagement with the inner surface of the drum 36. Springs 40 acting on the arms 38 tend to move them inwardly to retract the shoes 35 from engagement with the drum 36.

To understand the operation of the device, let it be assumed that the engine is idling and the accelerator pedal 32 raised. With the accelerator pedal 32 raised, the collars 28 will be rocked from the position illustrated in Fig. 3 to retract the rollers 25 from their respective operative positions. The gear-carrier 17 will therefore be free to rotate in either direction. The load on the shaft 13 will tend to prevent the driven shaft 11 of the change-speed device from rotating, and the gear 16 will therefore be stationary.

If it be assumed that the crankshaft 10 is rotating in a counter-clockwise direction (Fig. 3) the gear-carrier 17 will be rotated in a clockwise direction owing to the fact that the gear 16 is stationary. Because of the retracted position of the rollers 25, this rotation of the planet-gear carrier is not interfered with, the engine 10 runs, and the shaft 11 remains stationary.

When it is desired to start the automobile, the accelerator pedal 32 is depressed to increase engine speed. Simultaneously, with this depression of the accelerator pedal, the collars 28 are rocked and the rollers 25 restored to their respective operating positions where they prevent the clock-wise rotation of the gear-carrier. The gear-carrier is now compelled to remain stationary, and the shaft 11 is driven at reduced speed from the crankshaft 10 through the gears 15, 18, 19, and 16. Since the gear-carrier is stationary, there is no centrifugal force acting on the weights 39, and the shoes 35 are held out of engagement with the drum 36 by the action of the spring 40.

The device will operate to afford a reduced-speed drive as long as the accelerator pedal 32 is held depressed. When it is desired to increase the speed-ratio between the crankshaft 10 and the driven shaft 11, the accelerator pedal is raised, thus reducing engine speed. Owing to the momentum of the automobile, the shaft 11 tends to rotate at a speed greater than that of the crankshaft 10 and tends thereby to rotate the gear-carrier in the same direction in which it is rotating—the counter-clockwise direction. As the unidirectional brake including the rollers 25 is inoperative to prevent rotation of the gear-carrier in this direction, it begins to rotate. When this occurs, centrifugal force acting on the weights 39 moves the shoes 35 outwardly into engagement with the drum 36, thus tending to oppose relative rotation of the gear-carrier and the crankshaft 10 and thereby tending to force the driven shaft 11 to rotate at the same speed as the crankshaft 10. As the engine speed is increased by depression of the accelerator pedal 32, the gear-carrier tends also to increase in speed owing to the frictional engagement of the shoes 35, and drum 36. The greater the speed of the gear-carrier the greater will be the frictional drag opposing its rotation relative to the shaft 10, and the greater will therefore be the tendency for the driven shaft 11 to rotate at the same speed as the shaft 10.

In Figs. 4, 5, and 6 I illustrate a preferred form of an overrunning clutch or unidirectional brake suitable for use in controlling the rotation of the gear-carrier 17. In this arrangement, the rollers 25 do not bear directly against the disk 22. Instead, each roller has associated with it a shoe 40 the outer face of which is grooved to receive the associated roller and the inner face of which is curved to fit the disk 22. Adjacent each of the rollers 25 there is inserted in the stationary ring 23 an inclined wearing plate 41 against which the roll is adapted to bear. As in the previous arrangement, the ends of the rollers extend into radial slots in the collars 28 so that the brake may be rendered inoperative by rocking the collars 28 to carry the rolls out of engagement with the inclined wearing plates 41.

I claim as my invention:

1. A change-speed mechanism, comprising coaxial driving and driven gears of different sizes, a back-gear carrier rotatable relatively to said driving and driven gears, one or more pairs of back-gears mounted in said carrier, the two gears of each pair meshing respectively with said driving and driven gears, unidirectional brake means for preventing rotation of said carrier in one direction, mechanism for releasing said brake means, a control member for regulating the speed of said driving gear, and provisions interconnecting said control member and said brake-releasing mechanism whereby said brake-releasing mechanism may be operated jointly with said control member, and friction clutch means operable to prevent relative rotation of said driving and driven gears.

2. A change-speed transmission as set forth in claim 1 with the addition of speed-responsive means, responsive to the rotational speed of said carrier, for actuating said clutch means.

3. A change-speed transmission as set forth in claim 1 with the addition of speed-responsive means for actuating said clutch means.

4. A change-speed mechanism, comprising coaxial driving and driven gears of different sizes, a back-gear carrier rotatable relatively to said driving and driven gears, one or more pairs of back-gears mounted in said carrier, the two gears of each pair meshing respectively with said driving and driven gears, unidirectional brake means for preventing rotation of said carrier in one direction, mechanism for releasing said brake means, friction clutch means operable to prevent relative rotation of said driving and driven gears, said unidirectional brake means including a stationary part and a part rotatable with said carrier, one of said parts having a cylindrical surface, one or more shoes conforming to said surface, and a roller mounted in each shoe, the other of said parts having, in association with each roller, an inclined roller-engaging surface.

5. In combination, a variable-speed power-source, a speed-controlling member for said power-source, coaxial gears of different sizes, means operatively interconnecting one of said gears with said power-source, a back-gear carrier rotatable relatively to said gears, one or more pairs of back-gears mounted in said carrier, the two gears of each pair meshing respectively with said two coaxial gears, unidirectional brake means for preventing rotation of said carrier in one direction, mechnism for releasing said brake means, friction clutch means operable to prevent relative rotation of said driving and driven gears, and provisions under the control of said member for operating said brake-release means to release said brake when said power-source is operating at low speed.

6. In combination, a variable-speed power-source, a speed-controlling member for said power-source, coaxial gears of different sizes, means operatively interconnecting one of said gears with said power-source, a back-gear carrier rotatable relatively to said gears, one or more pairs of back-gears mounted in said carrier, the two gears of each pair meshing respectively with said two coaxial gears, unidirectional brake means for preventing rotation of said carrier in one direction, mechanism for releasing said brake means, friction clutch means operable to prevent relative rotation of said driving and driven gears, and provisions under the control of said member for operating said brake-release means.

ROBERT C. BERRY.